Nov. 28, 1961     T. E. DAHLEN     3,010,540

SHOCK ABSORBER

Filed June 2, 1958

INVENTOR.

THEODORE E. DAHLEN

BY Robert E. Howe

ATTORNEY

# United States Patent Office 3,010,540
Patented Nov. 28, 1961

3,010,540
SHOCK ABSORBER
Theodore E. Dahlen, St. Paul, Minn., assignor to General Mills, Inc., a corporation of Delaware
Filed June 2, 1958, Ser. No. 739,094
4 Claims. (Cl. 188—1)

This invention relates to shock absorbers and particularly to a shock absorber made from foam plastic formed in such manner so as to provide a constant deceleration of the object being retarded by the shock absorber.

The foam plastic shock absorber is made from a light weight cellular material which affords a weight advantage when used for example in conjunction with lighter than air craft.

One such foam plastic is Styrofoam, a trade name of the Dow Chemical Co., and is a foamed polystyrene. While Styrofoam is a rigid resinous plastic it can, however, be deformed or condensed markedly by the application of sufficient pressure.

Such foamed polystyrene as Styrofoam may be used in its solid form as a shock absorber but in the present embodiment I have cored the foam plastic to provide a more effective shock absorber which allows for retardation at a substantially uniform deceleration.

In the particular embodiment of my invention, I disclose cored foam plastic blocks as a shock absorber on a balloon gondola. It is an advantage to keep the overall weight of a gondola to a minimum, and the cored foam plastic blocks add little weight to the gondola. Further it is desirable to provide the gondola with a suitable shock absorbing means for preventing extensive damage to the gondola or the equipment therein when the gondola is caused to strike the earth upon completion of a flight.

Thus it is an object of my invention to provide an improved shock absorber made from cored foam plastic.

It is also an object of my invention to provide an improved shock absorber which provides for constant deceleration.

These and other objects will be apparent from the following specification and the drawings of which:

Figure 1:
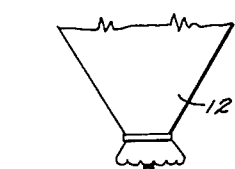
FIGURE 1 is an elevation view of a balloon gondola provided with my novel shock absorber.
Figure 4:
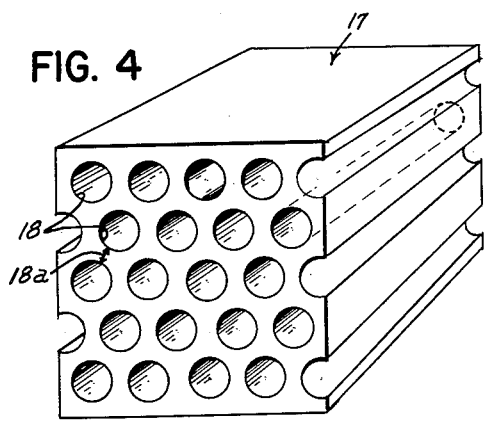
FIG. 4 is a perspective view of a block of cored foam plastic block.

Referring to FIG. 1, a balloon gondola 10 made of light weight aluminum sheeting is connected by load ring 11 to an inflated bag 12 which may be a helium filled balloon made of polyethylene material and well known in the art. The gondola 10 is divided by a floor 16 into two portions 13 and 14. The upper portion 13 is an enclosure for mounting instrumentation and the like or may carry personnel for upper air investigation. A doorway 15 is provided for access to the gondola, and a window 19 is provided for visual observation. The portion 14 is filled with foam plastic blocks 17 having cores 18 running therethrough. The blocks 17 are alternated in that the cores 18 run substantially parallel to floor 16 with every other block having its corings running in a direction normal to the corings of each adjacent block. The details of shock absorption by the foam plastic blocks 17 will be described in detail hereinafter.

The blocks 17 are retained in portion 14 by a thin sheet of aluminum 10a, which is crushed upon the gondola striking the earth, and the striking shock is absorbed by the cored foam plastic blocks 17.

Figure 2:
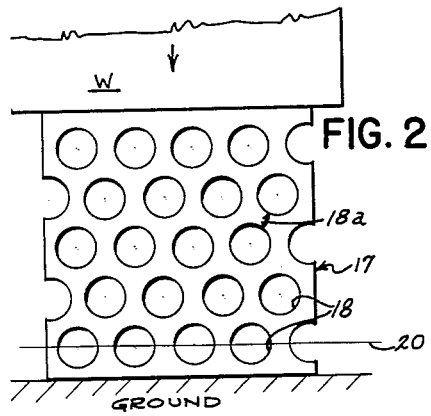
FIG. 2 is an elevation view of a single block of foam plastic material cored for improved shock absorption characteristics.

FIG. 2 is a single foam plastic block representing in this particular embodiment one cubic foot. Plastic material is cored out in a pattern as shown by cores 18 which pass through the block. It should be noted that the diameter of the individual cores 18 results in a greater area than the web portion of the foam plastic material adjacent to the cores. For example, the diameter of a core may be two inches, with the web 18a having a thickness of ¾ inch.

When a weighted block 17 strikes the ground the shock is absorbed first at the lower portion of the block 17 and that the webbing is caused to shear at the cores and is in a sense folded into the core openings as the shock is absorbed. This action begins with layer 20 and continues through each successive layer until the weighted object is at rest. By absorbing the shock on a layer to layer basis the deceleration of the weighted object is substantially uniform and stable.

Figure 5:
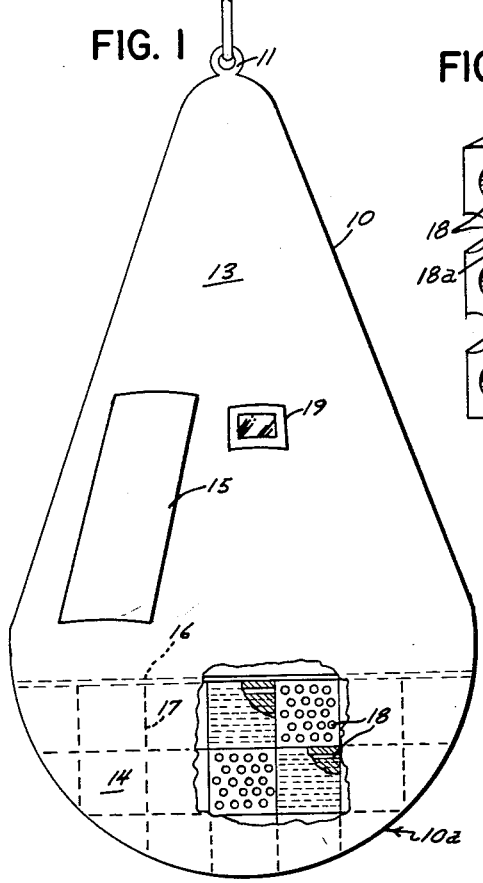
FIG. 5 is a diagrammatic illustration of the block under deformation.
Figure 5:
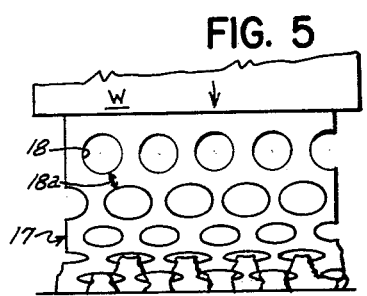

FIG. 5 is a representation of the shear action of the foam plastic in relation to the core opening, which occur from the bottom of the block up. The webbing between the core openings is caused to shear when absorbing the shock and as the webs are sheared they fold into the core openings layer by layer. Such action results in a substantially constant deceleration rate in the retardation of the gondola or weight as it comes to rest.

Figure 3:
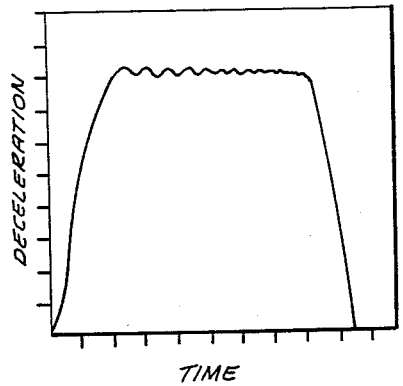
FIG. 3 is a graph of time versus deceleration.

As shown in the graph of FIG. 3 the time it takes to deflect the block is related to deceleration. It can be seen that the curve rises sharply as the forces are applied and then the deflection increases greatly as the force applied remains substantially constant until the desired reflection is attained and the object is at rest.

It should be noted that with a solid block or blocks of foam plastic without corings, that a rapid application of force, for example, eighty times gravity would cause the cellular construction of the foam plastic to explode and thus completely eliminate any and all shock absorption characteristics of a non-cored plastic block.

Thus the advantage of coring the foam plastic blocks is to present a construction which is sheared in a controlled manner by placing these cores in layers and allowing the shearing and corings of the plastic block to occur at a uniform rate.

As hereinabove described the blocks 17 of the shock absorber portion 14 are arranged such that the coring in one block is normal in relation to the coring in the adjacent block. This particular arrangement is to offer a shock absorbing portion regardless of the angle at which the gondola 10 strikes the earth.

While I have illustrated and described one embodiment of the invention, it is to be understood that certain changes, modifications, and substitutions may be made in the structure without departing from the scope and claims of the invention as set out in the appended claims.

I claim:

1. A shock absorbing block of synthetic resinous rigid condensable foam plastic material having a plurality of core openings provided therein, a first surface on one side thereof and a second surface on the opposite side thereof, said first surface being attached to an article for which protection is desired, said core openings separated one from the other by web portions of said plastic material, said core openings having a greater area than said web portions, said core openings being substantially parallel to said first surface whereby application of force to said block causes said web portions to shear and fold into said core openings.

2. A shock absorber comprising a destructible outer shell formed from thin metal sheet material to aid in absorbing shock energy and to prevent bursting apart of said shock absorber upon impact, synthetic resinous foam plastic material within said shell, said foam plastic material provided with a plurality of substantially parallel openings therethrough, said openings being separated from one another by web portions of said plastic material, said core openings having a relatively large area with respect to said web portions, wherein the volume of the openings is sufficient to receive the volume of plastic material forced thereinto.

3. A shock absorber having an upper surface and a bottom surface, said shock absorber comprising a collapsible outer shell, a plurality of foam plastic blocks located in said shell, said foam plastic blocks provided with a plurality of openings therethrough, said openings arranged in layers in each said block and substantially parallel to said upper surface of said shock absorber, whereby shock is absorbed from layer to layer at a substantially uniform rate of deceleration.

4. A shock absorber having an upper surface and bottom surface, said shock absorber comprising a collapsible outer shell, a plurality of cored foam plastic blocks arranged in layers within said shell, each of said cored plastic blocks provided with a plurality of substantially parallel cored openings running therethrough, each layer of cored plastic blocks having the axes of said cored openings substantially normal to the axes of said cored openings of contiguous plastic blocks in the same layer, and each said cored plastic block having said cored openings substantially parallel to said upper surface of said shock absorber, whereby shock is absorbed by shear and compression in each said cored plastic block layer by layer within said collapsible shell.

References Cited in the file of this patent

UNITED STATES PATENTS

| | | |
|---|---|---|
| 2,023,280 | Merrill | Dec. 3, 1935 |
| 2,409,910 | Stober | Oct. 22, 1946 |
| 2,625,683 | Roth et al. | Jan. 20, 1953 |
| 2,668,327 | Steele | Feb. 9, 1954 |
| 2,727,382 | Kurz | Dec. 20, 1955 |
| 2,728,479 | Wheeler | Dec. 27, 1955 |
| 2,857,510 | Haggerty et al. | Oct. 21, 1958 |